US008043665B2

(12) United States Patent
Chretien et al.

(10) Patent No.: US 8,043,665 B2
(45) Date of Patent: Oct. 25, 2011

(54) METHOD OF CONTROLLING GLOSS IN UV CURABLE OVERCOAT COMPOSTITIONS

(75) Inventors: Michelle N. Chretien, Mississauga (CA); Jennifer L. Belelie, Oakville (CA); Gordon Sisler, St. Catherines (CA)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 12/263,596

(22) Filed: Nov. 3, 2008

(65) Prior Publication Data

US 2010/0112232 A1 May 6, 2010

(51) Int. Cl.

| | |
|---|---|
| ***C08J 7/04*** | (2006.01) |
| *B05D 3/00* | (2006.01) |
| *B05D 1/36* | (2006.01) |
| *B05D 7/00* | (2006.01) |
| *B05D 1/02* | (2006.01) |
| *C08F 2/46* | (2006.01) |

(52) U.S. Cl. ........ 427/494; 427/454; 427/493; 427/261; 427/416; 427/417; 427/422; 427/427.4; 427/475; 427/465

(58) Field of Classification Search .................. 427/454, 427/493, 261, 416, 417, 422, 427.4, 475, 427/465

See application file for complete search history.

(56) References Cited

U.S. PATENT DOCUMENTS

| | | | | |
|---|---|---|---|---|
| 5,202,162 | A * | 4/1993 | Hart et al. | 427/282 |
| 6,905,732 | B1 * | 6/2005 | Dunshee et al. | 427/372.2 |
| 7,110,686 | B2 * | 9/2006 | Toyohara | 399/45 |
| 7,276,614 | B2 * | 10/2007 | Toma et al. | 554/37 |
| 7,279,587 | B2 | 10/2007 | Odell et al. | |
| 2003/0083771 | A1 * | 5/2003 | Schmidt | 700/119 |
| 2005/0013932 | A1 | 1/2005 | Dennis et al. | |
| 2005/0123685 | A1 | 6/2005 | Frazzitta et al. | |
| 2007/0120921 | A1 | 5/2007 | Carlini et al. | |
| 2007/0120922 | A1 * | 5/2007 | Belelie et al. | 347/100 |
| 2007/0120924 | A1 | 5/2007 | Odell et al. | |
| 2007/0142492 | A1 * | 6/2007 | Odell et al. | 522/74 |
| 2007/0253062 | A1 * | 11/2007 | Shimoda et al. | 359/580 |

OTHER PUBLICATIONS

Sears et al, "Technology of Plasticizers", Wiley & Sons, 1982, pp. 427-429, 469-471.*

Glass transition. (1992). In Academic Press Dictionary of Science and Technology. Retrieved from http://www.credoreference.com/entry/apdst/glass_transition.*

European Search Report, dated Feb. 3, 2010, for European Application No. 09173582.9.

U.S. Appl. No. 12/023,979, filed Jan. 31, 2008.

U.S. Appl. No. 12/144,233, filed Jun. 23, 2008.

* cited by examiner

*Primary Examiner* — Dah-Wei Yuan
*Assistant Examiner* — Jose Hernandez-Diaz
(74) *Attorney, Agent, or Firm* — Oliff & Berridge, PLC

(57) ABSTRACT

A method of controlling gloss of an image includes applying an overcoat composition of at least one gellant, at least one curable monomer, at least one curable wax and optionally at least one photoinitiator over a substrate, wherein the overcoat composition is curable upon exposure to ultraviolet radiation; following the applying of the overcoat composition and prior to curing the overcoat composition by applying ultraviolet radiation, applying heat to heat the applied overcoat composition to a temperature of at least 35° C.; and subsequent to the applying heat, applying ultraviolet radiation to the overcoat composition to substantially cure the overcoat composition.

17 Claims, No Drawings

METHOD OF CONTROLLING GLOSS IN UV CURABLE OVERCOAT COMPOSTITIONS

BACKGROUND

Described herein are methods of controlling gloss of an image using a UV curable overcoat, including applying heat to the overcoat following application but prior to UV curing of the overcoat. The UV curable overcoat includes a gellant and a curable wax component.

The UV curable overcoat method provides several advantages, including providing image permanence to an underlying image, and simultaneously permitting the gloss of the image to be controlled by the use of heat prior to UV curing, and optionally also by the amount of curable wax in the overcoat composition and/or the amount of overcoat composition applied to a substrate. Other advantages will be apparent from the description herein.

As digital color production printers continue to enter commercial printing markets, image permanence and document offset in images formed with such printers are issues that are being researched for continued improvement. A typical approach to attempting to improve image permanence and document offset is to apply an overcoat or overprint varnish. A variety of overcoat compositions are known, including oil-based compositions, aqueous-based compositions, and the like. For digital color production printers, it may be desirable to utilize an overcoat that may be applied in a digital fashion, for example via ink jet.

Besides image permanence and document offset, an overcoat composition may also affect gloss of the image. Often, an overcoat composition can adversely affect the gloss, for example by altering the gloss from a desired gloss for the image, typically making the image have a more matte appearance.

What is desired is a UV curable overcoat, capable of being digitally applied, that can be used to provide not only image permanence, but also to provide control over the gloss of the image.

SUMMARY

In embodiments, described is a method of controlling gloss of an image, comprising applying an overcoat composition comprised of at least one gellant, at least one curable monomer, at least one curable wax and optionally at least one photoinitiator over a substrate, wherein the overcoat composition is curable upon exposure to ultraviolet radiation; following the applying of the overcoat composition and prior to curing the overcoat composition by applying ultraviolet radiation, applying heat to heat the applied overcoat composition to a temperature of at least 35° C.; and subsequent to the applying heat, applying ultraviolet radiation to the overcoat composition to substantially cure the overcoat composition.

In further embodiments, described is a method of controlling gloss of an image, comprising preparing an overcoat composition comprised of at least one gellant, at least one curable monomer, at least one curable wax and optionally at least one photoinitiator, wherein the overcoat composition is curable upon exposure to radiation, the amount of at least one curable wax in the overcoat being based on a base gloss level to be exhibited by the overcoat composition; applying the overcoat composition over a substrate; following the applying of the overcoat composition and prior to curing the overcoat composition by applying ultraviolet radiation, applying heat to heat the applied overcoat composition to a temperature of at least 35° C. to increase the gloss level above the base gloss level; and subsequent to the applying heat, applying ultraviolet radiation to the overcoat composition to substantially cure the overcoat composition.

In still further embodiments, described is a method of controlling gloss of an image, comprising determining a desired gloss of an image; providing an overcoat composition comprised of at least one gellant, at least one curable monomer, at least one curable wax and optionally at least one photoinitiator, wherein the overcoat composition is curable upon exposure to radiation; applying the overcoat composition over a substrate; following the applying of the overcoat composition and prior to curing the overcoat composition by applying ultraviolet radiation, applying heat to heat the applied overcoat composition to a temperature of at least 35° C.; and subsequent to the applying heat, applying ultraviolet radiation to the overcoat composition to substantially cure the overcoat composition, wherein the desired gloss level is obtained by a combination of controlling a thickness of the overcoat composition applied and of controlling the heat applied to the overcoat composition.

EMBODIMENTS

Described are methods of controlling gloss of an image with a UV curable overcoat composition. The overcoat composition is comprised of at least one gellant, at least one curable monomer, at least one curable wax and optionally at least one photoinitiator. The gloss of the image is controlled using the overcoat composition by applying heat to the overcoat composition following application to a substrate but prior to curing of the overcoat composition by exposure to UV radiation, or by a combination of the heat application together with (1) setting and/or adjusting an amount of the at least one curable wax in the overcoat composition prior to application to a substrate and/or (2) setting and/or adjusting an amount of the overcoat composition to be applied over the substrate. In this manner, the end image can be made to have a desired gloss.

The overcoat composition is a radiation curable, particularly a UV curable, composition comprising at least one gellant, at least one curable monomer, at least one curable wax, and optionally at least one photoinitiator. The overcoat composition may also optionally include a stabilizer, a surfactant, or other additives. The overcoat composition is desirably substantially free, such as completely free, of colorant.

The overcoat composition may be applied at temperatures of from about 50° C. to about 120° C., such as from about 70° C. to about 90° C. At application temperatures, the overcoat composition may have a viscosity of from about 5 to about 16 cPs, such as from about 8 to 13 cPs. Viscosity values set forth herein are obtained using the cone and plate technique, at a shear rate of 1 $s^{-1}$. The overcoat compositions are thus well suited for use in devices in which the overcoat composition can be digitally applied, such as applied via ink jets.

The at least one gellant, or gelling agent, functions at least to increase the viscosity of the overcoat composition within a desired temperature range. For example, the gellant forms a solid-like gel in the overcoat composition at temperatures below the gel point of the gellant, for example below the temperature at which the overcoat composition is applied. For example, the overcoat composition ranges in viscosity from about $10^3$ to about $10^7$ cPs, such as from about $10^{3.5}$ to about $10^{6.5}$ cPs, in the solid-like phase. The gel phase typically comprises a solid-like phase and a liquid phase in coexistence, wherein the solid-like phase forms a three-dimensional network structure throughout the liquid phase and prevents the liquid phase from flowing at a macroscopic level. The overcoat composition exhibits a thermally reversible transition between the gel state and the liquid state when the temperature is varied above or below the gel point of the overcoat composition. This cycle of gel reformation can be repeated a number of times, since the gel is formed by physical, non-covalent interactions between the gelling agent molecules, such as hydrogen bonding, aromatic interactions, ionic bonding, coordination bonding, London dispersion interactions, or the like.

The temperature at which the overcoat composition is in a gel state is, for example, approximately below about 70° C., such as from below about 65° C. The gel overcoat composition may liquefy at temperatures of from about 65° C. to about 100° C., such as from about 70° C. to about 90° C. In cooling from the application temperature liquid state to the gel state, the overcoat composition undergoes a significant viscosity increase. The viscosity increase is at least a three orders of magnitude increase in viscosity, such as at least a four order of magnitude increase in viscosity. Once melted, for example at jetting temperature of >75° C., the material remains at a low viscosity, such as ≦10 cPs, until it reaches the gel point. At this point, the viscosity increases rapidly, for example to ≧$10^5$ cPs. Once gelled, the material will remain at a high viscosity until it again reaches about >70° C., at which point the viscosity will again reach about ≦10 cPs again.

Gellants suitable for use in the radiation curable overcoat compositions include a curable gellant comprised of a curable amide, a curable polyamide-epoxy acrylate component and a polyamide component, a curable composite gellant comprised of a curable epoxy resin and a polyamide resin, mixtures thereof and the like. Inclusion of the gellant in the overcoat composition permits the overcoat composition to coat a substrate (with or without an image thereon), without excessive penetration into the substrate because the viscosity of the overcoat composition is quickly increased as the overcoat composition cools. Excessive penetration of a liquid into a porous substrate such as paper can lead to an undesirable decrease in the substrate opacity. The curable gellant may also participate in the curing of the at least one monomer of the overcoat composition. The increase in viscosity by including the gellant may also reduce the diffusion of oxygen into the overcoat because oxygen is an inhibitor of free radical polymerization.

The gellants suitable for use in the overcoat composition may be amphiphilic in nature in order to improve wetting when the overcoat composition is utilized over a substrate having silicone oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Pat. Nos. 7,276,614 and 7,279,587, the entire disclosures of which are incorporated herein by reference.

As described in U.S. Pat. No. 7,279,587, the amide gellant may be a compound of the formula

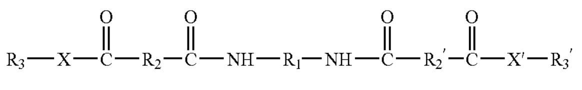

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, although the number of carbon atoms can be outside of these ranges, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, although the number of carbon atoms can be outside of these ranges, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, although the number of carbon atoms can be outside of these ranges, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms, although the number of carbon atoms can be outside of these ranges, (ii) arylene groups having from about 5 carbon atoms to about 15 carbon atoms, such as from about 5 carbon atoms to about 13 carbon atoms or from about 5 carbon atoms to about 10 carbon atoms, although the number of carbon atoms can be outside of these ranges, (iii) arylalkylene groups having from about 6 carbon atoms to about 32 carbon atoms, such as from about 7 carbon atoms to about 33 carbon atoms or from about 8 carbon atoms to about 15 carbon atoms, although the number of carbon atoms can be outside of these ranges, or (iv) alkylarylene groups having from about 6 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

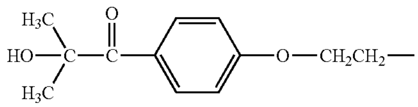

, groups derived from 1-hydroxycyclohexylphenylketone, of the formula

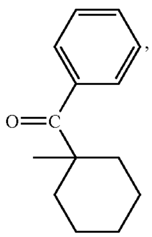

, groups derived from 2-hydroxy-2-methyl-1-phenylpropan-1-one, of the formula

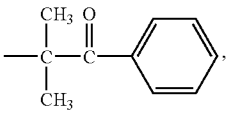

, groups derived from N,N-dimethylethanolamine or N,N-dimethylethylenediamine, of the formula

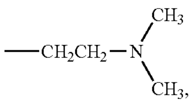

, or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula $-N_4-$, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference, and thus are not further detailed herein.

In embodiments, the gellant may comprise a mixture comprising:

(I)

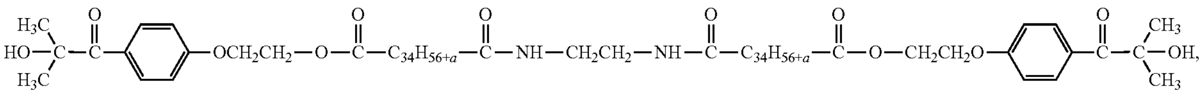

(II)

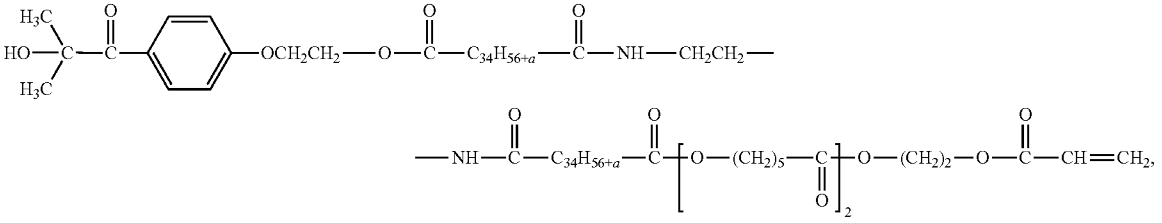

and (III)

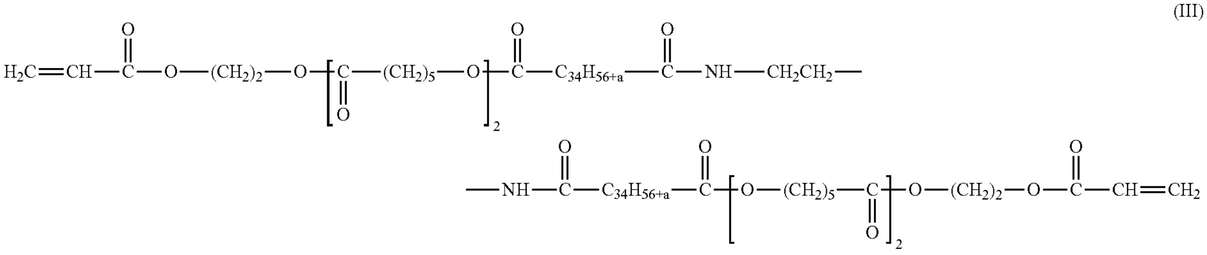

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

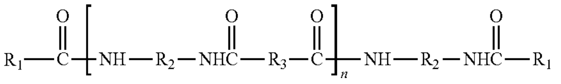

wherein $R_1$ is an alkyl group having at least seventeen carbons, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The overcoat composition may include the gellant in any suitable amount, such as about 1% to about 50% by weight of the overcoat composition. In embodiments, the gellant may be present in an amount of about 2% to about 20% by weight of the overcoat composition, such as about 3% to about 10% by weight of the overcoat composition, although the value can also be outside of this range.

Examples of the at least one curable monomer of the overcoat composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, mixtures thereof and the like.

The term "curable monomer" is also intended to encompass curable oligomers, which may also be used in the overcoat composition. Examples of suitable radiation curable oligomers that may be used in the overcoat compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like.

In embodiments, the curable monomer includes both a propoxylated neopentyl glycol diacrylate (such as SR-9003 from Sartomer) and a dipentaerythritol pentaacrylate (such as SR399LV from Sartomer). The inclusion of the pentaacrylate is advantageous in providing more functionality, and thus more reactivity, compared to the diacrylate. However, the amount of the pentaacrylate needs to be limited in the overcoat composition as too much can adversely affect the viscosity of the composition at application temperatures. The pentaacrylate thus makes up 10% by weight or less of the composition, such as 0.5 to 5% by weight of the composition.

The curable monomer in embodiments is included in the overcoat composition in an amount of, for example, about 20 to about 95% by weight of the overcoat composition, such as about 30 to about 85% by weight of the overcoat composition, or about 40 to about 80% by weight of the overcoat composition.

The overcoat composition may optionally further include at least one photoinitiator for initiating curing, for example UV curing. Any photoinitiator that absorbs radiation, for example UV light radiation, to initiate curing of the curable components of the formulation may be used, although it is desirable if the photo initiator does not substantially produce a yellow coloration upon cure.

Examples of free-radical photoinitiators, suitable for use with compositions including acrylates, include benzophenones, benzoin ethers, benzil ketals, α-hydroxyalkylphenones, and acylphosphine photoinitiators, such as sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-hydroxy-1-(4-(4-(2-hydroxy-2-methylpropionyl)-benzyl)-phenyl)-2-methylpropan-1-one (available as Ciba IRGACURE 127); titanocenes; isopropylthioxanthone (ITX); 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof.

An amine synergist, that is, co-initiators that donate a hydrogen atom to a photoinitiator and thereby form a radical species that initiates polymerization (amine synergists can also consume oxygen dissolved in the formulation—as oxygen inhibits free-radical polymerization its consumption increases the speed of polymerization), for example such as ethyl-4-dimethylaminobenzoate and 2-ethylhexyl-4-dimethylamino-benzoate, may also be included.

In embodiments, the photoinitiator package may include at least one alpha-hydroxy ketone photoinitiator and at least one phosphinoyl type photoinitiator(s). One example of the alpha-hydroxy ketone photoinitiator is IRGACURE 127, while one example of the phosphinoyl type photoinitiator is IRGACURE 819, both available from Ciba-Geigy Corp., Tarrytown, N.Y. The ratio of the alpha-hydroxy ketone photoinitiator to the phosphinoyl type photo initiator may be, for example, from about 90:10 to about 10:90, such as from about 80:20 to about 20:80 or from about 70:30 to about 30:70.

The total amount of photoinitiator included in the overcoat composition may be, for example, from about 0 to about 15%, such as from about 0.5 to about 10%, by weight of the overcoat composition. In embodiments, the composition may be free of photoinitiators, for example where e-beam radiation is used as the curing energy source.

The overcoat composition also includes at least one curable wax. The curable wax is used to control the gloss of the image overcoated with the overcoat composition, as will be discussed below. A wax is solid at room temperature, specifically at 25° C. Inclusion of the wax thus may also promote an increase in viscosity of the overcoat composition as it cools from the application temperature. Thus, the wax may also assist the gellant in avoiding bleeding of the overcoat composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include, but are not limited to, those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, for example, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, for example, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

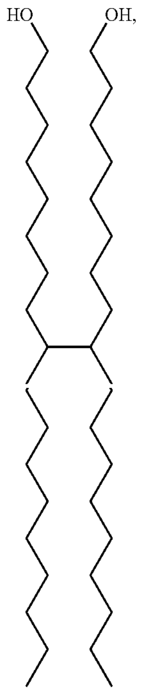

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

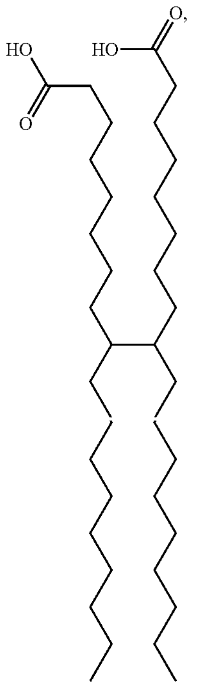

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

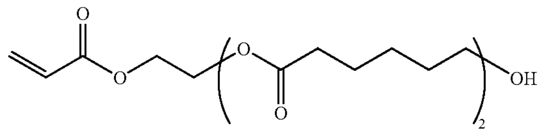

SR495B from Sartomer Company, Inc.; and

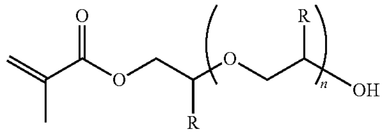

CD572 (R=H, n=10) and SR604 (R=Me (methyl), n=4) from Sartomer Company, Inc.

The curable wax can be included in the overcoat composition in an amount of from, for example, about 0.1% to about 30% by weight of the overcoat composition, such as from about 0.5% to about 20% or from about 0.5% to 15% by weight of the overcoat composition. The amount of curable wax to include affects the gloss provided to an image by the overcoat composition, and thus may be determined, set and/or adjusted based on a desired base gloss to be provided by the overcoat composition, which base gloss may be adjusted by application of heat to the applied overcoat composition as detailed below.

The overcoat composition may also optionally contain an antioxidant stabilizer. The optional antioxidants of the overcoat compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

The overcoat composition may further optionally include conventional additives to take advantage of the known functionality associated with such conventional additives. Such additives may include, for example, defoamers, surfactants, slip and leveling agents, etc.

The overcoat composition is substantially colorless. "Substantially colorless" refers to the overcoat composition being substantially or completely transparent or clear after undergoing curing. For this, the composition may be substantially free of colorants, such as pigments, dyes or mixtures thereof. The overcoat composition described herein does not yellow upon curing and remains substantially or completely transparent and clear, that is, little or no measurable difference in any of L* a* b* values or k, c, m, y is observed. Being "substantially non-yellowing" or "substantially or completely transparent or clear" refers to the overcoat composition changing color or hue upon curing in an amount of less than about 15%, such as less than about 10% or less than about 5%, for example about 0%.

In embodiments, the overcoat composition described herein may be prepared by mixing the curable monomer, curable wax and gellant at a temperature of from about 75° C. to about 120° C., such as from about 80° C. to about 110° C. or from about 75° C. to about 100° C., until homogenous, for example for from about 0.1 hour to about 3 hours, such as about 2 hours. Once the mixture is homogenous, then the photoinitiator may be added. Alternatively, the curable monomer, curable wax, gellant and photoinitiator may be combined immediately.

The overcoat composition may be applied directly onto an image receiving substrate, and/or may be applied directly onto an image previously formed on the image receiving substrate. In this regard, the overcoat composition may be applied (1) over portions of (a portion being less than all) or all of at least one printed image formed on the substrate, (2) over one or more portions of the substrate, and over less than all printable portions of the substrate (a printable portion being that portion of a substrate to which a printing device is capable of providing an image), or (3) over substantially all to all printable portions of the substrate. When the overcoat composition is applied to less than all portions of a substrate or an image on the substrate, an end image with variable gloss characteristics can be obtained.

When the overcoat composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimaged areas of the substrate. The typical composition deposition level is in an amount of from about 5 to about 50 picoliters drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with the same information used to form the image such that only one digital file is needed to produce the image and the overcoat composition. Thus, the overcoat composition may be fully digital.

Following application, the overcoat is typically cooled to below the gel point of the composition. This rapidly pins the overcoat composition to the substrate. To control the gloss of the image provided by the overcoat composition, the applied, and desirably gelled, overcoat composition is subjected to a heat treatment, for example to expose the overcoat composition to a temperature of at least 35° C., for example to a temperature of from about 40° C. to about 110° C. or from about 40° C. to about 80° C. This heat treatment must be effected prior to the overcoat composition being exposed to UV curing. By the heat treatment, the overcoat composition is subjected to reflow, for example wherein the overcoat composition is briefly re-melted and then again solidified. For reflow, it is not necessary for the overcoat composition to be cooled all the way below the gel point; it is only necessary for the composition to be at a viscosity that will allow for reflow to be achieved by heating. It is found that this procedure can increase the gloss provided by the overcoat composition, beyond the base gloss of the composition. The gloss may be increased by from, for example, about 1 to about 30 gloss units, such as from about 2 to about 25 gloss units or from about 5 to about 20 gloss units (wherein the gloss units are measured at 75° using a BYK Gardner glossmeter).

The application of heat may be conducted for a period of time sufficient to achieve the above-mentioned reflow, for example for about 0.01 to about 10 seconds or from about 0.1 to about 1 second, following application of the overcoat composition and before the applying of the ultraviolet radiation.

The heat may be applied to the overcoat composition using any suitable source. In embodiments, the heat may be applied with an infrared light-emitting lamp. The temperature applied to the overcoat composition may be controlled by controlling the power level of the infrared light-emitting lamp, higher power levels achieving higher temperatures in exposing the overcoat composition. In further embodiments, the heat may be applied with a convection heating device such as a convection oven. The heating device is desirably located immediately before the UV curing lamps in the process direction.

After the heat treatment of the applied overcoat composition, the composition is then exposed to UV radiation (curing energy) to cure the composition. Upon exposure to a suitable UV source of curing energy, for example, ultraviolet light, the photoinitiator absorbs the energy and sets into motion a reaction that converts the gel-like overcoat composition into a cured protective overcoat. The viscosity of the overcoat composition further increases upon exposure to the suitable source of curing energy, such that it hardens to a solid. The monomer and wax, and optionally the gellant, in the composition contain functional groups that polymerize as a result of the exposure of the photoinitiator to UV light, forming a polymer network. This polymer network provides printed images with, for example, durability, thermal and light stability, and scratch and smear resistance.

The energy source used to initiate crosslinking of the radiation curable components of the composition can be actinic, for example, radiation having a wavelength in the ultraviolet region, because such energy provides excellent control over the initiation and rate of crosslinking. Suitable sources of actinic radiation include mercury lamps, xenon lamps, carbon arc lamps, tungsten filament lamps, lasers, light emitting diodes, sunlight, and the like.

Ultraviolet radiation, especially from a medium pressure mercury lamp with a high speed conveyor under UV light, for example, about 20 to about 70 m/min, may be desired, wherein the UV radiation is provided at a wavelength of about 200 to about 500 nm for about less than one second. In embodiments, the speed of the high speed conveyor is about 15 to about 35 m/min under UV light at a wavelength of about 200 to about 450 nm. The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

In addition to the heat treatment method for controlling gloss with the overcoat composition, the gloss may also be controlled through setting the amount of curable wax in the composition. For example, a base gloss of the overcoat composition may be set through the amount of curable wax in the composition. The heat treatment may then be used to desirably adjust the gloss imparted by the overcoat composition above the base gloss, as discussed above.

In setting the base gloss, when the overcoat composition includes 5% by weight of the curable wax or less, application of the overcoat composition may act to increase the gloss of the underlying image or substrate (make the image appear glossier), whereas including additional amounts of the curable wax in the overcoat composition may then act to decrease the gloss of the overcoated image (make the image appear less glossy, or more matte, compared to the initial increase in gloss and/or the underlying image or substrate).

This property of the curable wax can thus be used to assist in controlling the gloss of an image, for example by first determining a base gloss for the overcoat composition, setting the amount of at least one curable wax to include in the overcoat composition based on the determined base gloss, and preparing the overcoat composition to contain the set amount of the at least one curable wax. The overcoat composition can then be applied over a substrate, for example applied to an image or portion thereof previously formed on a substrate such as paper, or applied directly to a substrate or portion thereof.

In embodiments, the setting of the amount of the at least one curable wax to include in the overcoat composition may be accomplished by providing the desired base gloss to a lookup table that includes entries for the color of image to be overcoated (a given color), and entries for the gloss achieved with the overcoat composition at varying amounts of the at least one curable wax in the overcoat composition. The lookup table can be derived by pre-evaluating the overcoat composition for gloss imparted to various different colors at a set application amount.

Information for various lookup tables may be included in a database, from which a computing device, such as a computer, may derive an estimated amount of curable wax necessary to achieve the desired base gloss, which derivation may then be used to set the amount of curable wax to include in the overcoat composition. This can be advantageous where the lookup tables do not have exact entries for a given color or curable wax amount.

The amount of overcoat composition applied to the substrate and/or underlying image on the substrate may also affect the gloss of the end image. In general, the higher the amount of overcoat composition used, the lower the gloss level of the end image. This information thus may also be used in controlling the gloss of the end image. For example, base gloss levels for various overcoat composition thicknesses can be included in a lookup table, providing information on how much overcoat composition to apply for a particular base gloss. The lookup table can be derived by pre-evaluating the overcoat composition for gloss imparted to various different colors and various different coating amounts. As above, a database of lookup tables and a computing device may also be used to derive the amount of overcoat composition to apply.

The substrate employed can be any appropriate substrate depending upon the end use of the print. Exemplary substrates include plain paper, coated paper, plastics, polymeric films, treated cellulosics, wood, xerographic substrates, ceramics, fibers, metals and foils, and mixtures thereof, optionally comprising additives coated thereon.

When coating a toner-based image, the fused toner-based print is obtained first and then subjected to an ink jet printer containing the overcoat composition. The toner-based print can be prepared by any suitable conventional xerographic technique or variant thereof.

Similarly, when coating an ink-based image, the ink-based image is generated first and then subjected to an ink jet printer containing the overcoat composition. If the ink-based image is formed using an ink jet printer, then the ink-based image can be subjected to a separate ink jet printer containing the overcoat composition or the ink jet ink can be housed in the same ink jet printer as the composition, whereby the composition is coated onto the substrate and/or image as a colorless, transparent fluid after the ink jet ink image is formed. When the overcoat composition is coated over an ink-based image, particularly an image produced using an ink jet printer, the image can be prepared by any suitable conventional process or variant thereof.

The disclosure will be illustrated further in the following Examples. Parts and percentages are by weight unless otherwise indicated.

Example 1

Overcoat compositions having the components and amounts set forth in Table 1 were prepared by mixing all of the components together at 90° C. for 1 hour. The overcoat compositions were then applied to Xerox Digital Color Gloss via K-Proofer (gravure coating). Following application and prior to curing with a Lighthammer 6 UV light, prints were exposed to three different temperatures, and the temperature experienced by the print was measured using Thermolabel temperature sensitive tape (Paper Thermometer Co.). The gloss after curing was measured at 75° using a BYK Gardner glossmeter. The results are summarized in Table 2 below.

TABLE 1

| Component | Overcoat Composition, wt % |
|---|---|
| Curable amide gellant | 7.5 |
| UNILIN 350 - acrylate wax | 5.0 |
| SR399LV (Sartomer) | 5.0 |
| Irgacure 819 | 1.0 |
| Irgacure 127 | 3.5 |
| Irgastab UV10 (Ciba) | 0.2 |
| SR9003 (Sartomer) | 77.8 |
| TOTAL | 100.0 |

Three different prints were subjected to heat treatment with the IR lamp. Each sample was placed on a conveyor moving at approximately 10 m/min and passed under IR lamps, followed by the UV curing lamp in sequence.

TABLE 2

| Print Sample | Treatment Temperature (° C.) | Gloss at 75° (ggu) |
|---|---|---|
| Standard | None | 55 |
| 1 | 40 | 61 |
| 2 | 55 | 71 |
| 3 | 70 | 78 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of controlling gloss of an image, comprising applying an overcoat composition comprised of at least one gellant, at least one curable monomer, at least one curable wax and optionally at least one photoinitiator over a substrate, wherein the overcoat composition is curable upon exposure to ultraviolet radiation and wherein for the applying a temperature of the overcoat composition is above at least a gel point of the overcoat composition;

following the applying of the overcoat composition, cooling the applied overcoat composition to a temperature below the gel point of the overcoat composition and, subsequent to the cooling, applying heat to heat the applied overcoat composition to a temperature of at least 35° C.; and subsequent to the applying heat, applying ultraviolet radiation to the overcoat composition.

2. The method according to claim 1, wherein the applying heat heats the overcoat composition to a temperature of from about 40° C. to about 110° C.

3. The method according to claim 1, wherein the applying heat heats the overcoat composition to a temperature of from about 40° C. to about 80° C.

4. The method according to claim 1, wherein the applying heat is conducted for about 0.01 to about 10 seconds.

5. The method according to claim 1, wherein the applying heat is conducted for about 0.1 to about 1 seconds.

6. The method according to claim 1, wherein the applying heat comprises exposing the applied overcoat composition to an infrared light-emitting lamp.

7. The method according to claim 1, wherein the applying heat comprises exposing the applied overcoat composition to a convection heating device.

8. The method according to claim 1, wherein the substrate includes on a surface thereof at least one printed image, and wherein the overcoat composition is applied over some but less than all portions, or over all portions, of the at least one printed image.

9. The method according to claim 1, wherein the overcoat composition is applied over one or more printable portions of the substrate, and over less than all printable portions of the substrate.

10. The method according to claim 1, wherein the at least one curable monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, isobornyl methacrylate, lauryl acrylate, lauryl methacrylate, isodecylmethacrylate, propoxylated glycerol triacrylate, lauryl acrylate, neopentyl glycol propoxylate methylether monoacrylate, caprolactone acrylate, 2-phenoxyethyl acrylate, isooctylacrylate, isooctylmethacrylate, butyl acrylate, and mixtures thereof, and wherein the at least one gellant comprises at least one amide gellant.

11. The method according to claim 10, wherein the at least one gellant is a mixture comprising:

applying the overcoat composition over a substrate, wherein for the applying a temperature of the overcoat composition is above at least a gel point of the overcoat composition;

following the applying of the overcoat composition, cooling the applied overcoat composition to a temperature below the gel point of the overcoat composition and, subsequent to the cooling, applying heat to heat the applied overcoat composition to a temperature of at least 35° C.; and subsequent to the applying heat, applying ultraviolet radiation to the overcoat composition, wherein the desired gloss level is obtained by a combination of controlling an amount of the at least one curable wax in the overcoat composition, controlling a thickness of the applied overcoat composition and of controlling the heat applied to the overcoat composition.

14. The method according to claim 13, wherein the applying heat comprises exposing the applied overcoat composition to an infrared light-emitting lamp or to a convection heating device.

15. The method according to claim 13, wherein the amount of the at least one curable wax to include in the overcoat composition comprises providing a base gloss level to a lookup table for a given color, wherein the lookup table com- (I)

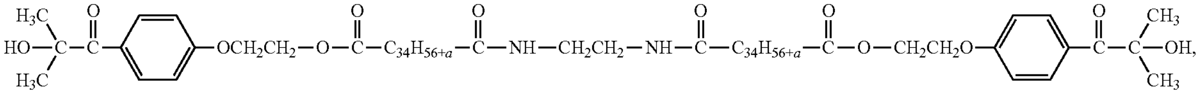, (II)

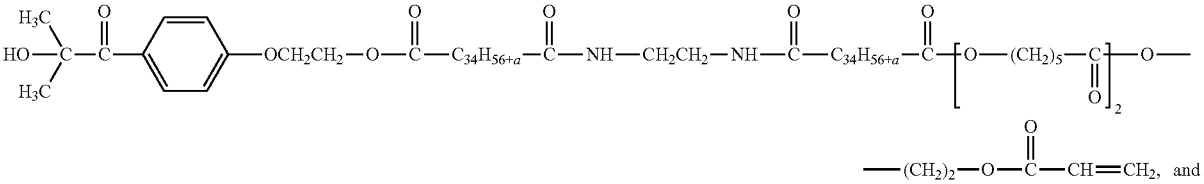, and (III)

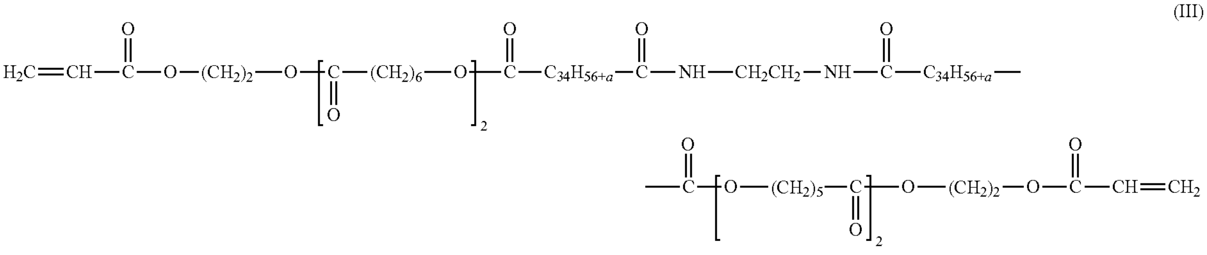

wherein $—C_{34}H_{56+a}—$ represents a branched alkylene group which may include unsaturations and cyclic groups, wherein a is an integer of 0, 1, 2, 3, 4, 5, 6, 7, 8, 9, 10, 11, or 12.

12. The method according to claim 10, wherein the at least one curable wax comprises a hydroxyl-terminated polyethylene wax functionalized with at least one curable group.

13. A method of controlling gloss of an image, comprising determining a desired gloss of an image;

providing an overcoat composition comprised of at least one gellant, at least one curable monomer, at least one curable wax and optionally at least one photoinitiator, wherein the overcoat composition is curable upon exposure to ultraviolet radiation;

prises the gloss level provided by the overcoat composition for the given color at varying amounts of the at least one curable wax in the overcoat composition.

16. The method according to claim 13, wherein the applying heat heats the overcoat composition for about 0.1 to about 1 seconds.

17. The method according to claim 13, wherein the applying heat heats the overcoat composition to a temperature of from about 40° C. to about 80° C. for about 0.1 to about 1 seconds following application of the overcoat composition and before the applying of the ultraviolet radiation.

* * * * *